April 28, 1970    J. M. KEEFER    3,508,347
PHONOCARDIOGRAM SIMULATOR

Filed Dec. 19, 1967    2 Sheets-Sheet 1

INVENTOR.
JOHN M. KEEFER
BY
*J. M. McCoy*
*William H. King*
ATTORNEYS

April 28, 1970   J. M. KEEFER   3,508,347
PHONOCARDIOGRAM SIMULATOR
Filed Dec. 19, 1967   2 Sheets-Sheet 2

INVENTOR.
JOHN M. KEEFER
BY
William H. King
ATTORNEYS

United States Patent Office 3,508,347
Patented Apr. 28, 1970

3,508,347
PHONOCARDIOGRAM SIMULATOR
John M. Keefer, Titusville, Fla., assignor to the United
States of America as represented by the Administrator
of the National Aeronautics and Space Administration
Filed Dec. 19, 1967, Ser. No. 691,909
Int. Cl. G09b 23/28
U.S. Cl. 35—17        2 Claims

ABSTRACT OF THE DISCLOSURE

A device for producing electrical voltage waves that simulate the sounds of a human heart. This device is used to calibrate phonocardiograms.

---

The invention described herein was made by an employee of the United States Government and may be manufactured and used by or for the Government for governmental purposes without the payment of any royalties thereon or therefor.

The invention relates generally to a phonocardiogram (PKG) simulator and more specifically concerns a device that produces electrical voltage waves that simulate the sounds of a human heart.

A phonocardiogram is a device that produces electrical signals which exactly duplicate, in time and amplitude, the sounds of a human heart. Such a device has become a very important tool in physiological monitoring of astronauts in flights and during flight simulation. To calibrate and check out a phonocardiogram, it is necessary to have a device that produces electrical waves that simulate the sounds of a human heart.

It is, therefore, the primary object of this invention to provide a device that produces electrical waves which simulate the sounds of a human heart.

Another object of this invention is to provide a phonocardiogram simulator that accurately controls the amplitudes of all simulated sounds.

A further object of this invention is to provide a phonocardiogram simulator that accurately controls the durations between all simulated sounds.

Other objects and advantages of this invention will become apparent hereinafter and in the drawings in which.

Figure 1:
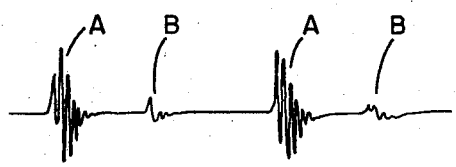
FIGURE 1 is a drawing of an idealized or near idealized PKG wave.

The drawing in FIGURE 1 is two complete cycles of an idealized PKG wave. Each cycle consists of an A portion and a B portion. These two portions are the first two sounds produced by every heartbeat. A heartbeat might produce other sounds; however, the two portions A and B, are all that are needed to calibrate PKG equipment. To generate an idealized PKG wave it is necessary to generate the shapes of portions A and B with the proper duration between them, and then fill in the wave shapes with a higher frequency signal. This invention consists of an uncomplicated technique using well-known electronic components for generating an idealized PKG wave.

In describing the preferred embodiment of the invention illustrated in the drawings, specific terminology will be resorted to for the sake of clarity. However, it is not intended to be limited to the specific terms so selected, and it is to be understood that each specific term includes all technical equivalents which operate in a similar manner to accomplish a similar purpose.

Figure 2:
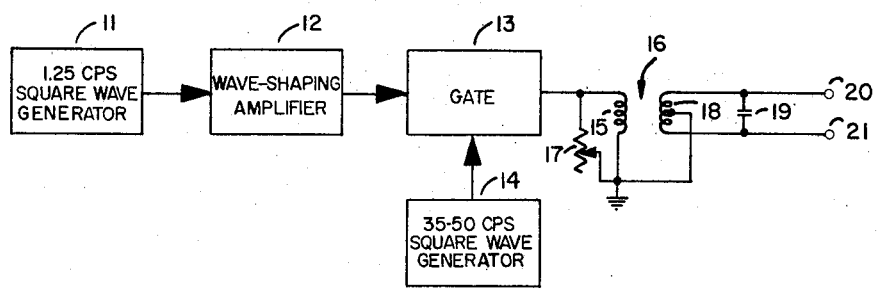
FIGURE 2 is a block diagram of this invention.

Turning now to the specific embodiment of the invention selected for illustration in the drawings, the number 11 in FIGURE 2 designates a square wave generator. The frequency of this generator determines the frequency of the generated idealized PKG wave. Generator 11 is shown as having a frequency of 1.25 c.p.s., however, it could have a frequency other than this frequency. The output of square wave generator 11 is applied to a wave-shaping amplifier 12 which produces the wave shapes of portions A and B in FIGURE) 1 in response to each cycle of generator 11. These wave shapes of portions A and B are applied to a gate 13 to open it. A square wave generator 14, with a frequency of 35–50 c.p.s. is applied to gate 13. The output of gate 13 is applied to the primary 15 of an output transformer 16. A potentiometer 17 is connected across primary winding 15 to adjust the output voltage level. A tuning and wave shaping capacitor 19 is connected across the secondary 18 of transformer 16. The idealized PKG wave in FIGURE 1 is produced across output terminals 20 and 21.

Figure 3:
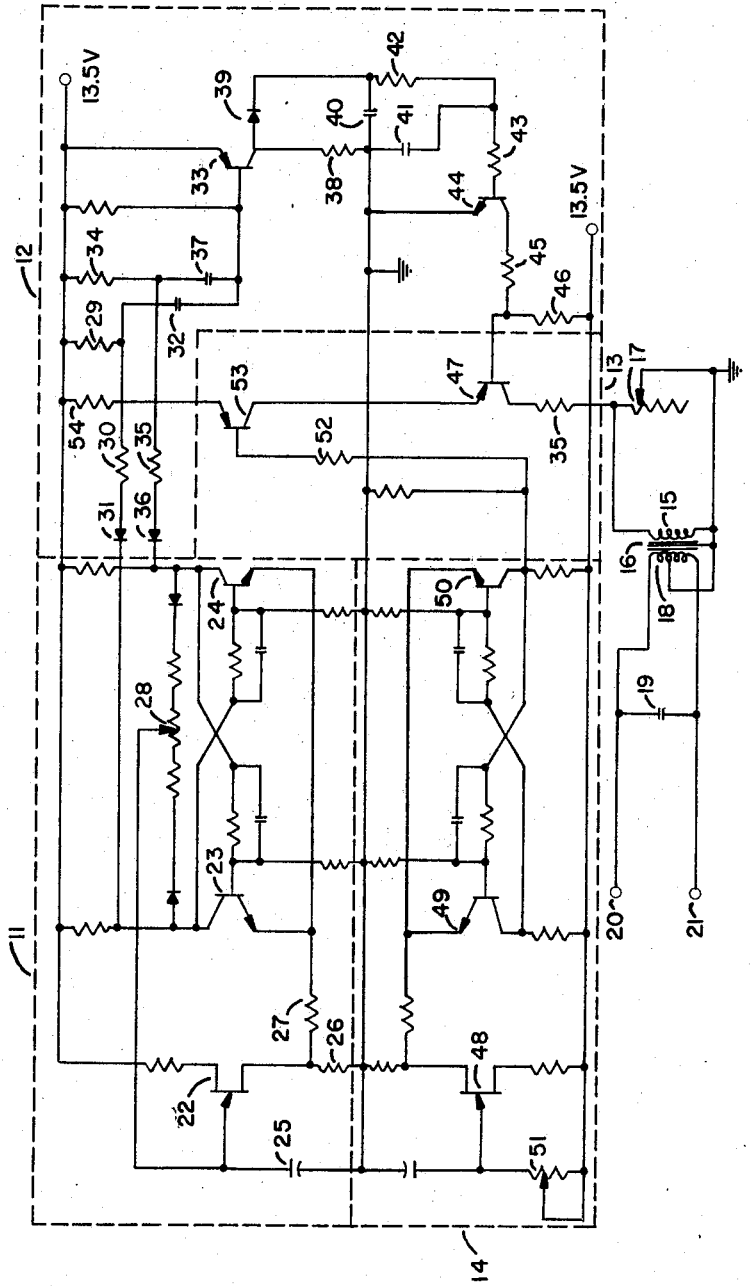
FIGURE 3 is a schematic drawing of this invention.

Referring now to FIGURE 3, the square wave generator 11 includes a unijunction transistor 22, and two NPN transistors 23 and 24. Transistors 23 and 24 and their associated circuitry form a conventional flip-flop and unijunction transistor 22 supplies the timing and triggering functions. Whenever transistor 22 becomes conductive, capacitor 25 discharges through transistor 22 and resistor 26 to ground. The resulting voltage produced across resistor 26 is applied through resistor 27 to the emitters of transistors 23 and 24 thereby causing the flip-flop to change form one state to the other. Consequently, square waves, which are 180 degrees out of phase, are generated at the collectors of transistors 23 and 24. The frequency of these square waves are constant (1.25 c.p.s.) and their duty cycles are variable by means of a potentiometer 28. Square wave generator 11 is disclosed in detail on pages 145 and 147 of the fifth edition of General Electric Transistor Manual and, therefore, is not described in detail in this specification. The function of generator 11 is to generate constant frequency square waves at the collectors of transistor 23 and 24 that are 180 degrees out of phase; and to provide means, potentiometer 28, for changing the duty cycles of these generated square waves.

During the portion of each cycle that transistor 23 is conducting there is conduction from the 13.5 voltage source through resistors 29 and 30, and a diode 31. This conduction produces a voltage drop across resistor 29 which is applied through a capacitor 32 to the base of a PNP transistor 33 causing it to conduct. Likewise, during the portion of each cycle that transistor 24 is conducting there is conduction from the 13.5 voltage source through resistors 34 and 35, and diode 36. The resulting voltage drop across resistor 34 is applied through a capacitor 37 to the base of transistor 33. The voltage drops applied to the base of transistor 33 causes it to conduct and produce a voltage drop across resistor 38. These voltage drops are applied through a diode 39 to a shaping network consisting of capacitors 40 and 41, and resistors 42 and 43. This shaping network shapes the A and B portions of each cycle as shown in FIGURE 1. The amplitudes of portions A and B are determined by the sizes of resistors 29 and 34, and the duration between portions A and B is determined by the setting of potentiometer 28. The output from the shaping network is inverted and amplified by an amplifer consisting of an NPN transistor 44 and resistors 45 and 46. The output from the amplifier, which is at the junction of resistors 45 and 46, is applied to the base of a PNP transistor 47.

Square wave generator 14 is a multivibrator consisting of unijunction transistor 48 and NPN transistors 49 and 50, and their associated circuitry. A square wave is generated at the collector of transistor 50 with a frequency of 35–50 c.p.s. The frequency of the output of generator 14 can be changed by changing the setting of potentiometer 51. The circuitry for generator 14 is disclosed in detail on pages 145 and 146 of the fifth edition of General Electric Transistor Manual and, therefore, is not fully described in this specification. The output from generator 14 is applied through a resistor 52 to the base of a PNP transistor 53.

Transistors 47 and 53 along with resistors 54 and 55 constitute gate 13. When inputs to the gate are applied to both the base of transistor 47 and the base of transistor 53, there is conduction from the 13.5 voltage source through resistor 54, transistor 53, transistor 47, resistor 55, and potentiometer 17 to ground. This conduction causes a voltage drop across potentiometer 17 which is applied through transformer 16 to output terminals 20 and 21. The voltage wave produced across these two output terminals is the idealized PKG wave shown in FIGURE 1.

In the operation of this PKG simulator, generator 11 produces square waves at the collectors of transistors 23 and 24 that are 180 degrees out of phase. The negative (relative to 13.5 volts) portions of these square waves cause conduction through resistors 29 and 30, and diode 31, and through resistors 34 and 35, and diode 36. The resulting voltage drops across resistors 29 and 34 are applied through capacitors 32 and 37 to the base of transistor 33. That is, these voltage drops make the base of transistor 33 negative with respect to its emitter. Consequently, these voltage drops cause transistor 33 to conduct which produce voltage drops across resistor 38. These voltage drops are shaped and amplified to form the outlines of portions A and B in FIGURE 1 at the base of transistor 47. The amplitudes of these portions are determined by the values of resistors 29 and 34, and the duration between portion A and portion B is determined by the setting of potentiometer 28. The square waves produced by generator 14 are applied to the base of transistor 53. Consequently, the resulting conductions of transistors 47 and 53 produce voltage drops across potentiometer 17 which are applied through transformer 16 to output terminals 20 and 21. The output across terminals 20 and 21 is the idealized wave shown in FIGURE 1.

This intention provides a simple means for generating an electrical wave which simulates the first two sounds of a heartbeat. This PKG simulator may be used to check out telemetry systems and instrumentation of phonocardiogram monitor systems in hospitals, medical care centers, surgical areas, and manufacturing facilities. This simulator may also be useful for demonstrations and training in research on the propagation of waveforms.

It is to be understood that the form of the invention herewith shown and described is to be taken as a preferred embodiment. Various changes may be made in the shape, size, and arrangement of parts. For example, equivalent elements may be substituted for those illustrated and described herein, parts may be reversed, and certain features of the invention may be utilized independently of the use of other features, all without departing from the spirit or scope of the invention defined in the subjoined claims. Simulators constructed in accordance with this invention could use wave generators, wave shaping networks, and gates different from those disclosed without departing from the invention.

What is claimed is:
1. A phonocardiogram simulator comprising:
   (A) first means for generating, at a frequency corresponding to the repetition rate of a heartbeat, separate first and second electrical waves;
   (B) second means connected to said first means for shaping said first and second electrical waves so that they correspond to the general envelope shapes of the first and second sounds, respectively, of said heartbeat;
   (C) third means for generating an electrical signal at a frequency corresponding to the frequency within the general envelope shapes of said first and second sounds;
   (D) fourth means connected between said second and third means for combining said first and second electrical waves and said generated electrical signal; and
   (E) fifth means connected to said fourth means for shaping said combined first and second electrical waves and generated electrical signal; thereby providing an output electrical wave that simulates said first and second sounds of said heartbeat.
2. A phonocardiogram simulator according to claim 1 wherein said fifth means includes:
   (A) a transformer comprising primary and secondary windings;
   (B) a potentiometer connected across said primary winding; and
   (C) a tuning and wave shaping capacitor connected across said secondary winding.

References Cited

UNITED STATES PATENTS 3,384,981  5/1969  Baessler et al. _____ 35—17
3,399,467  9/1968  Ravin _____ 35—17

EUGENE R. CAPOZIO, Primary Examiner

H. S. SKOGQUIST, Assistant Examiner

U.S. Cl. X.R.
128—2.06